Patented July 15, 1952

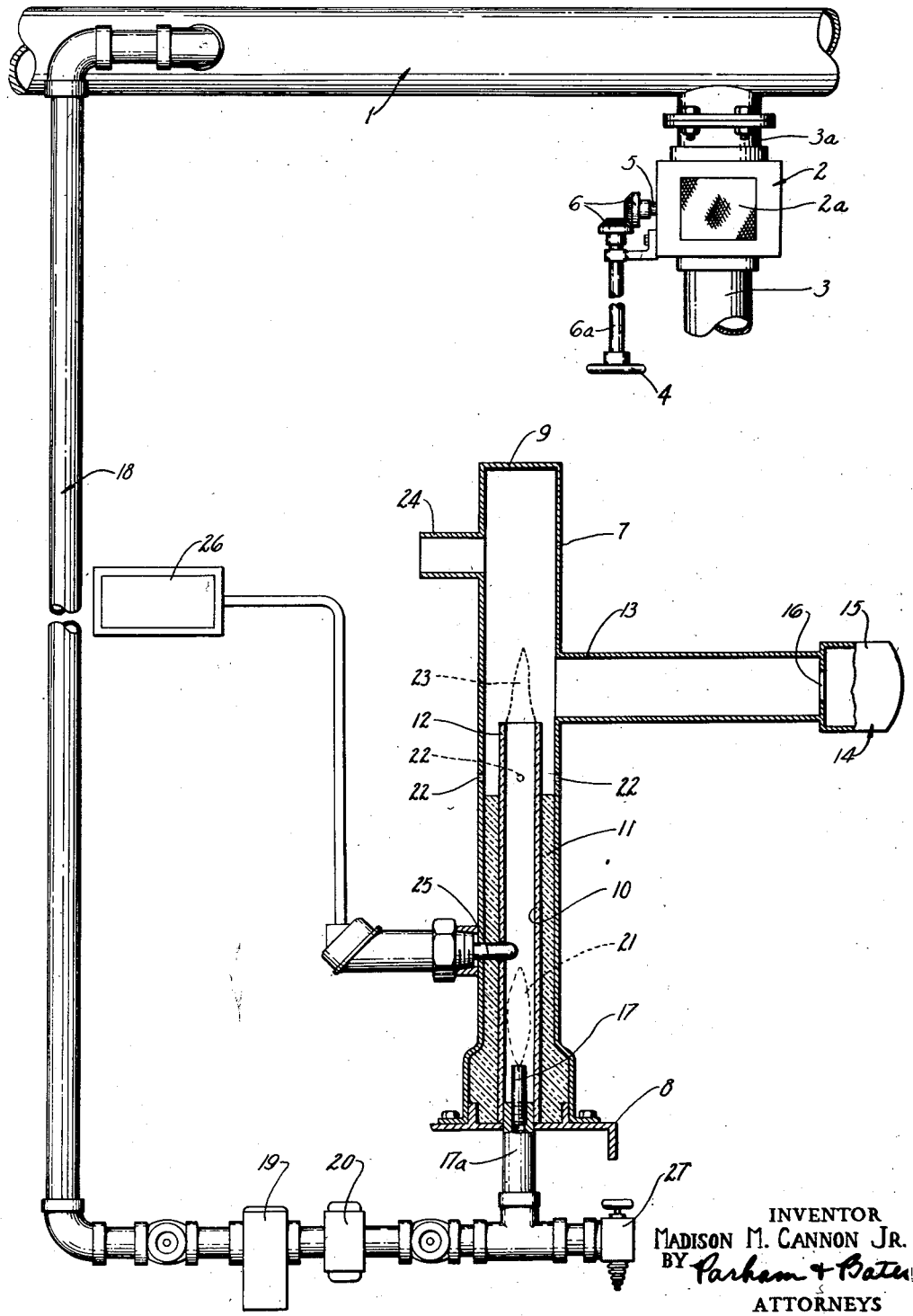
INVENTOR
MADISON M. CANNON JR.
BY Parham & Bates
ATTORNEYS

2,603,085

UNITED STATES PATENT OFFICE 2,603,085

MEANS FOR AND METHOD OF ASCERTAINING COMBUSTION CHARACTERISTICS OF PREMIXTURES

Madison M. Cannon, Jr., West Hartford, Conn., assignor to Emhart Manufacturing Company, a corporation of Delaware Application August 19, 1947, Serial No. 769,390

11 Claims. (Cl. 73—25)

The present invention relates to a means for and method of ascertaining the combustion characteristics of premixtures, particularly premixtures of combustible gas and air such as are used as a source of heat energy for glass feeder forehearths, and other heat utilizing equipment.

It is an object of the present invention to provide a means for the method of ascertaining whether fuel and air have been united in a premixture in chemically correct proportions required for complete combustion of the fuel.

Another object of the present invention is to provide a simple, inexpensive device to facilitate the accurate regulation of the correct proportions of combustible gas and air supplied to a heat liberating means, such as a gas burner.

A further object of the present invention is the provision of a means for and method of conveniently indicating deviations in the proportions of constituents of a premixture from the chemically correct proportions required for efficient combustion thereof.

Another object of the present invention is to provide a simple, inexpensive means for and method of indicating whether intermediate combustion products will result from the combustion of a given premixture.

A still further object of the present invention is to provide a means for and method of detecting variations in combustion characteristics of a combustible medium being intimately united with a medium, capable of supporting combustion, to form a premixture.

Other objects and advantages of the present invention will become apparent or be pointed out in the course of the following description which has particular reference to the accompanying drawing which shows, mainly in vertical section, a preferred embodiment of the present invention in operative relationship with a supply main into which combustible gas and air may be introduced in desired quantities by suitable regulating means.

At present most feeder forehearths and certain glass furnaces are heated by means of premixed fuel and air supplied to multiplicities of burners placed at points of vantage in the wall structures thereof. Where it is economically feasible to do so, a combustible gas, such as natural gas, illuminating gas, or producer gas is employed as fuel. Under certain conditions of operation, an amount of air sufficient for the complete combustion of the gas is premixed therewith to form a combustible mixture. It is noteworthy that a premixture of a combustible and air in the chemically correct proportions for complete combustion may be burned to final products of combustion without a secondary air supply being required.

The combusible gas is piped to the glass making plant where it is mixed with the proper amount of air preparatory to being supplied to burners of a heat utilizing unit. The pressure of such gas may be controlled by a commercial regulator. It has been found in practice that the chemical composition, temperature and specific gravity of the gas vary and adversely affect the combustion. The temperature and barometric pressure of air also vary and similarly affect the combustion. When, as in one application of the present invention to a glass melting furnace, neither fuel nor air is preheated, then the flame temperature developed by the combustion is only a few hundred degrees Fahrenheit higher than the furnace temperature, and will decrease very rapidly if the fuel-air mixture is either lean or rich, with a resultant high fuel consumption or even inability to maintain the desired temperature. Regulation of flame temperature, therefore, is of concern in applying the principle of the present invention. By providing a mixture of fuel and air in correct chemical proportions, a maximum flame temperature will be produced. This also will provide a nuetral atmosphere which generally is best in carrying on the glass-making process. It is possible easily and accurately to compensate for variations of the gas supply as may be required, thereby assuring efficient utilization of the heat content of the gas and a properly regulated source of heat for the glass making units.

Referring to the accompanying drawing, the present invention may be used as an aid in establishing a chemically correct premixture of a combustible gas and air in a supply main, generally designated 1, which may feed gas burners (not shown) of a glass furnace or other associated heat utilizing device. A combustible gas may be introduced into a flow regulator, generally designated 2, by means of a communicating pipe line 3 and may be mixed with any desired quantity of air as determined by the setting of the flow regulator. Air may enter the flow regulator through entry port 2a or any other means provided for the purpose. After the gas is mixed with air to form a combustible premixture, it may flow to supply main 1 by means of a communicating pipe 3a. The setting of the flow regulator may be varied at will by the rotation of a hand wheel 4 which turns shaft 5 of the flow regulator by virtue of miter gears 6 and connecting shaft 6a. The flow regulator, per se, does not constitute a part of the present invention and may be any one of a number of commercially available types, such as a McKee Cone-Type Proportional Mixer manufactured by the Eclipse Fuel Engineering Company of Rockford, Illinois.

The illustrative embodiment of the present invention comprises a cylindrical outer housing 7 secured in an upright position to a stationary base, generally designated 8, the housing being closed at its upper end as shown at 9. A tubular flue 10, made from porcelain or any durable refractory material, may be centrally disposed within housing 7 and may be thermally insulated therefrom for a major portion of its axial length by insulation 11, a small portion of the upper end of the flue projecting beyond the insulation as indicated at 12. Another cylindrical member 13 is joined to housing 7 at a position corresponding to the location of the top end of flue 10, substantially as illustrated in the accompanying drawing, and has secured to its outer end an optical sighting device, generally designated 14, which may consist of an eye shield 15 in which is formed a centrally disposed aperture 16. By use of this sighting device, an attendant may view the upper end of flue 10.

A small jet 17 may be sealed within the lower end of flue 10 by conventional means, such as shown at 17a, and may be supplied with a sample of the premixture from supply main 1 by means of a communicating pipe line, generally designated 18, in which a filter 19 and pressure regulator 20 may be provided as an aid in assuring that a clean, pressure regulated sample of the premixture will be fed to jet 17. The premixture may issue from jet 17 and be ignited in any conventional manner, thus forming a small flame within flue 10, as indicated by dotted lines at 21.

A purpose of the long tubular flue 10 is to carry the combustion products away from the flame so that a minimum of light is visible across the upper end of the flue. If the mixture is rich, a carbon monoxide flame will be produced. Such a flame is not very luminous and, unless the background is dark, is hard to see. The flue 10 is insulated as shown and described in order to maintain a sufficiently high gas temperature to secure ignition at the top of the tube if carbon monoxide is present. After a short period of time, flue 10 will become heated and will reach a state of thermal equilibrium, the upper end 12 of the flue attaining a temperature sufficient to ignite any of the unburned combustible gases passing thereto from jet 17.

Secondary air to support the combustion of these gases may be introduced into housing 7 below the upper end of flue 10 by means of holes 22, preferably four in number, formed in the side wall of the housing. Thus, if the premixture of gas and air, being fed to jet 17 from supply main 1, contains an amount of air insufficient to permit the complete combustion of the combustible gas united therewith in the premixture, intermediate combustion products, such as carbon monoxide, will be formed above flame 21 and will join with other unburned combustibles, issuing from jet 17, and secondary air, introduced by holes 22, to burn with a flame at the upper end of flue 10, as indicated by dotted lines at 23. The final products of combustion may leave housing 7 by means of exhaust pipe 24, secured in the upper end thereof.

The flame at the upper end of the flue may be readily observed by an attendant looking through optical sighting device 14 and will serve as an indication that the premixture in the supply main requires additional air which may be added by a suitable adjustment of the setting of flow regulator 2. The attendant may turn hand wheel 4 while viewing the upper end of flue 10 and will know when sufficient air has been added to the premixture by the disappearance of flame 23. At this point, the entire combustible gas in the premixture will be burned in flame 21 and no intermediate combustion products will be formed. It has been found in practice that extremely accurate regulation of the proportions of constituents in the premixture is possible with the aid of the present device.

Another feature of the present invention is the provision of a thermocouple 25 in the side of housing 7 and flue 10 in position to measure the temperature above flame 21. Thermocouple 25 may be connected to a conventional recording potentiometer 26 which may be used to indicate and record the temperature being measured. The potentiometer may be placed at any convenient position where its temperature indication may be noted periodically by the attendant, who, with the aid of the potentiometer readings, may judge the nature of the premixture in supply main 1.

A definite, fixed volume of premixture issues from jet 17 in any given time period because of the fixed size of the jet and the constant pressure of the premixture, entering the jet, which is maintained by pressure regulator 20. If the premixture, burning above jet 17, contains the chemically correct proportions of combustible gas and air, heat will be liberated in flame 21 at a given rate and potentiometer 26 will indicate a corresponding temperature value. If, for any reason, the premixture contains an insufficient amount of air, a smaller amount of heat will be liberated at a lower rate than that pertaining when the chemically correct premixture is burned and potentiometer 26 will indicate a correspondingly lower temperature value; simultaneously, combustion will occur above the end of flue 10 as has been described hereinbefore.

In case the premixture issuing from jet 17 should contain an excessive amount of air, the rate of heat liberation will again be less than that pertaining when the chemically correct mixture is burned, and potentiometer 26 will again indicate a proportionately lower temperature reading. However, as has been explained hereinbefore, no combustion will occur above flue 10 since no intermediate combustion products or unburned combustible gas, from the premixture issuing from jet 17, will remain after combustion in flame 21.

Thus, observation of the temperature reading of potentiometer 26 will indicate to the attendant a divergence of the premixture in supply main 1 from the chemically correct premixture. The presence or absence of a flame above flue 10 will indicate an insufficient or excessive amount of air, respectively, in the premixture relative to the proper amount of air for complete combustion of the combustible gas.

It will be understood by those skilled in the art that flow regulator 2 may be adjusted by hand wheel 4 to proportion the constituents, entering the supply main, as required to form a chemically correct premixture for complete combustion. Furthermore, it is noteworthy that the present invention may be used as an aid in the accurate adjustment of any type of flow regulator that may be used to premix the constituents in the desired proportions.

If the combustion characteristics of the fuel-air mixture, being supplied to supply main 1 from flow regulator 2, should vary, the temperature reading of potentiometer 26 will change and serve, in conjunction with the presence or absence of a flame above flue 10, as an indication of the nature of the adjustment that must be made in the proportions of the components of the premixture to restore it to the desired composition.

Occasionally, it may be necessary or desirable to adjust the setting of pressure regulator 20 in order to regulate the amount of premixture issuing from jet 17. To facilitate such an adjustment, pet cock 27 may be provided in the line after the regulator, and may be used to determine occasionally if pressure regulator is maintaining the desired fixed pressure. It may be adapted for the connection thereto of any conventional pressure measuring means (not shown), such as a U tube, one side of which may be connected to the pet cock and the other side vented to the atmosphere.

Specific reference has been made in this specification to the application of the present invention in the glass industry and to the use of producer gas, illuminating gas, or natural gas as the combustible of the premixture. It should be understood that such reference is by way of illustration and not by way of limitation and that the present invention may be used to advantage wherever a combustible premixture is involved. Thus, by way of example, the present invention may be used advantageously to adjust the proportions of a light fuel oil vapor and air being united to form a combustible mixture.

I do not wish to be limited to the details of the illustrative embodiment of the invention shown in the drawing as various changes therein and modifications thereof will readily occur to those skilled in the art.

Having described a preferred embodiment of my invention and a practical application thereof, I claim:

1. In a device for ascertaining the combustion characteristics of a premixture of a combustible and a medium capable of supporting combustion, an upwardly extending flue, means positioned within the lower end of said flue for burning therein a sample of the premixture, and a housing surrounding said flue, said housing being formed to define an aperture adjacent to said flue for the ingress of secondary air to support combustion at the upper end of said flue of combustible gases passing thereto from said first named means, said housing also being formed to define an aperture through which evidence of combustion at the upper end of said flue may be observed, said housing further being formed to define an opening for the egress therefrom of spent products resulting from combustion occurring therein.

2. Apparatus as defined in claim 1 and, in addition, means positioned within said flue to measure the temperature above said first named means.

3. In a device for ascertaining the combustion characteristics of a premixture of a combustible and a medium capable of supporting combustion, an upwardly extending flue, means positioned within the lower end of said flue for burning therein a sample of the premixture, a housing surrounding said flue, means for introducing secondary air into said housing adjacent to said flue to support combustion at the upper end of said flue of combustible gases passing thereto from said first named means, means for the egress from said housing of spent products resulting from combustion occurring therein, and means associated with said housing to permit the observation of the upper end of said flue.

4. Apparatus as defined in claim 3 and, in addition, means positioned within said flue to measure the temperature above said first named means.

5. Apparatus comprising a vertically disposed flue, an enclosure surrounding said flue and thermally insulated therefrom, means positioned within the lower end of said flue for burning therein a premixture of a combustible and a medium capable of supporting combustion, means positioned within said flue to measure the temperature above said first named means, means for introducing adjacent to the upper end of said flue a secondary medium for supporting combustion above said flue of combustible gases passing thereto from said first named means, means for the egress from the enclosure of spent products resulting from combustion within said flue and above said flue, and means through which to observe the upper end of said flue.

6. Apparatus as defined in claim 5 in which said flue comprises a tube of refractory material.

7. Apparatus as defined in claim 6 and, in addition, adjustable means for regulating the proportion of combustible to combustion supporting medium in the premixture burned thereby.

8. Apparatus comprising a more or less cylindrical housing, a vertically disposed tube of refractory material centrally positioned therein and insulated therefrom, means connected with the lower end of said tube for burning therein a premixture of air and fuel, means positioned within said tube above said first named means to measure the ambient temperature resulting from the combustion of the premixture, means connected with said housing for introducing secondary air to the upper end of said tube to support the combustion thereat of combustible gases passing thereto from said first named means, an exhaust pipe connected with said housing for the egress of combustion products therefrom, and optical sighting means through which to observe the upper end of said tube for evidence of combustion thereat.

9. Apparatus as defined in claim 8 in which said optical sighting means comprises a tubular member secured at right angles to said housing, an eye shield secured to the outer end of said tubular member, and means within said tubular member to limit the extent of the field of vision of the upper end of said tube.

10. Apparatus as defined in claim 9 in which said first named burning means comprises a conventional jet for burning a gaseous mixture.

11. The method of ascertaining the relative proportions of a regulatable premixture of combustibles and combustion supporting medium which includes burning a pressure regulated flow of the premixture at a first point from which additional combustibles and combustion supporting medium are excluded, measuring the temperature produced by said burning to determine deviations from that produced by a premixture properly proportioned for complete combustion of the constituent combustibles and combustion supporting medium, directing the products of combustion from said first point to a second point, excluding from said second point combustibles other than those remaining in the products of combustion from the burning of the premixture at the first point, providing an additional combustion supporting medium at said second point for sustaining combustion at said second point of combustibles contained in said products of combustion, and continually supplying ignition heat to said second point from said first point to provide for simultaneous burning at both points, a flame at said second point indicating the presence of combustibles in the aforesaid products of combustion, the threshold point of no flame at said second point indicating the complete combustion of the combustibles of said premixture without an excess of combustion supporting medium in said premixture, and an absence of flame at said second point together with a temperature other than that produced by a premixture properly proportioned for complete combustion registered by said measuring means indicating an excess of combustion supporting medium in said premixture.

MADISON M. CANNON, JR.

REFERENCES CITED

The following references are of record in the file of this patent:

UNITED STATES PATENTS

| Number | Name | Date |
|---|---|---|
| 1,525,406 | Martienssen | Feb. 3, 1925 |
| 1,627,204 | Ruben | May 3, 1927 |
| 1,942,323 | Blodgett | Jan. 2, 1934 |
| 2,052,181 | Krogh | Aug. 25, 1936 |
| 2,058,522 | Smyly | Oct. 27, 1936 |
| 2,519,237 | Dufour | Aug. 15, 1950 |
| 2,523,721 | Russell et al. | Sept. 26, 1950 |

FOREIGN PATENTS

| Number | Country | Date |
|---|---|---|
| 22,595 | Great Britain | Oct. 9, 1902 |